United States Patent [19]

Christian

[11] Patent Number: 4,574,711
[45] Date of Patent: Mar. 11, 1986

[54] GRANULATED SOLID FUEL BURNER

[76] Inventor: J. Vernon Christian, 2160 Longreen Rd., Kingsport, Tenn. 37660

[21] Appl. No.: 499,470

[22] Filed: May 31, 1983

[51] Int. Cl.⁴ .............................................. F23D 1/00
[52] U.S. Cl. .................................. 110/264; 110/102; 110/104 B; 110/254; 110/261; 110/302; 110/310
[58] Field of Search .................. 110/102, 104 B, 116, 110/118, 254, 255, 256, 260, 261, 262, 263, 264, 265, 293, 302, 310; 431/173, 11; 126/104 R, 109, 110 R

[56] References Cited

U.S. PATENT DOCUMENTS

| | | | |
|---|---|---|---|
| 2,973,727 | 3/1961 | Northcote | 431/173 |
| 3,543,700 | 12/1970 | Baigas, Jr. et al. | 110/254 |
| 3,589,315 | 6/1971 | Hart | 110/264 |
| 4,147,116 | 4/1979 | Graybill | 110/264 |
| 4,311,102 | 1/1982 | Kolze et al. | 110/102 |
| 4,321,034 | 3/1982 | Taccone | 110/263 |
| 4,333,405 | 6/1982 | Michelfelder et al. | 110/264 |
| 4,335,664 | 6/1982 | Lucas et al. | 110/264 |
| 4,366,802 | 1/1983 | Goodine | 110/116 |
| 4,407,205 | 10/1983 | Beaufrere | 110/264 |

Primary Examiner—Albert J. Makay
Assistant Examiner—Steven E. Warner
Attorney, Agent, or Firm—Willian Brinks Olds Hofer Gilson & Lione

[57] ABSTRACT

A burner for use in burning granulated solid fuel including a burner head having a combustion chamber and inlet and outlet openings at opposite ends thereof communicated with the combustion chamber. Means is provided to deliver granulated solid fuel to the inlet opening and means is provided for delivering primary combustion air to the inlet opening. The primary combustion air is preheated by passing along the burner head prior to entry to the inlet opening and a pilot assembly in the combustion chamber maintains a constant pilot during turndown of the burner. A retention barrier in the combustion chamber retains fuel particles larger than a predetermined size in the combustion chamber to insure complete incineration thereof.

4 Claims, 5 Drawing Figures

GRANULATED SOLID FUEL BURNER

BACKGROUND OF THE INVENTION

This invention relates to granulated solid fuel burners, and more particularly to one which insures more complete combustion of the fuel and prevents flashback in the fuel supplied thereto, which allows efficient burner operation over a wide turndown range, and which provides for control of flue gas temperature exiting the burner.

With the advent of concern for energy conservation, it has become increasingly important to provide combustion devices capable of burning less expensive and more plentiful fuels. One general type of such fuels includes the so-called granulated solid fuels such as ground wood particles, wood shavings and sawdust, and other non-wood granulated substances such as ground rubber, ground bagasse, etc. Such fuels can be difficult to burn but nevertheless can produce hot flue gases which can be used for a variety of applications, including boilers, warm air furnaces, etc. As in all combustion devices, it is important that the combustion process be carried out efficiently for, if not, the burner will generate excessive smoke and soot, and unburned or incompletely burned fuel will remain in the burner further reducing its efficiency or even interrupting its operation.

Furthermore, it is desirable that the burner have a wide turndown range, i.e., that it be capable of operating at a greatly reduced output level during periods of reduced demand or non-demand, and that it resume normal operation quickly when output demand resumes. In addition, burners of the type should be capable of easy startup.

Still further, it is desirable that the temperature of flue gases exiting the burner be controllable.

SUMMARY OF THE INVENTION

The present invention overcomes the deficiencies and satisfies the needs discussed above by providing a burner for use in burning granulated solid fuels which includes a fuel delivery and combustion air delivery assembly constructed to prevent flashback and explosions in the fuel feed system. The burner of this invention incinerates most of fuel particles quickly and allows free passage of flue gas therethrough but includes means serving to retain larger fuel particles therein until they are incinerated. The burner of this invention also includes a constant pilot assembly which utilizes a portion of the fuel entering the burner to produce a constant ignition source so that the burner can operate efficiently over a wide turndown range.

Additional objects of the present invention are to provide a burner for use in burning granulated solid fuels which is relatively inexpensive in construction, yet is reliable and efficient in performance.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the burner of this invention comprises a head having a lateral inlet opening at one end and an outlet opening at its other end, a combustion chamber communicating the inlet and outlet openings, means defining a passageway communicating with the inlet opening, means for delivering granulated solid fuel to the passageway, means for delivering combustion air to the passageway to mix with the fuel prior to entering the combustion chamber, the passageway and the fuel and air delivery means being constructed to provide a negative pressure in the fuel delivery means and to cause the mixture of fuel and air passing through the passageway to travel at a velocity greater than the flame speed of the fuel.

Broadly, the combustion air delivery means includes means defining a cavity surrounding the head and communicated at one end with the passageway, and means in the cavity forming a spiral duct, whereby combustion air entering the cavity is caused to travel in a spiral path around the head and to be preheated prior to entry into the passageway. In a preferred form, valve means is provided to control the flow of combustion air to the passageway.

In a preferred form, the passageway includes a tubular conduit extending into the head at the inlet opening, the fuel delivery means includes a conduit communicated with the passageway conduit, and the combustion air delivery means delivers combustion air to the passageway conduit upstream of the fuel delivery conduit. In a most preferred form, the combustion air delivery means includes a conduit which is concentric with and surrounds the passageway conduit and the fuel delivery conduit, and the latter terminates inside the passageway conduit.

In another aspect, the burner of this invention comprises a head having an inlet opening at one end and an outlet opening at its other end, a combustion chamber communicating the inlet and outlet openings, means for delivering granulated solid fuel to the inlet opening, means for delivering primary combustion air to the inlet opening, and means in the combustion chamber forming an apertured barrier for preventing passage of fuel particles larger than a predetermined size. In a preferred form, the burner includes means for delivering secondary combustion air to the combustion chamber on the upstream side of the apertured barrier. In a most preferred form, the secondary combustion air delivery means is at the bottom of the combustion chamber.

In still another aspect, the burner of the present invention comprises a head having an inlet opening at one end and an outlet opening at its other end, a combustion chamber in the head communicating the inlet and outlet openings, means for delivering granulated solid fuel to the inlet opening, means for delivering combustion air to the inlet opening, and means for delivering cooling air to the combustion chamber at a location near the outlet opening for controlling the temperature of flue gas exiting the outlet opening.

In yet another aspect, the burner of the present invention comprises a head having an inlet opening at one end and an outlet opening at its other end, means for delivering granulated solid fuel to the inlet opening, means for delivering primary combustion air to the inlet opening, a pilot assembly in the combustion chamber including means defining a pilot chamber in the combustion chamber for receiving some of the fuel entering the inlet opening, and means for supplying air to the pilot chamber.

In a preferred form, the inlet opening is disposed laterally of the combustion chamber and the pilot assembly includes a body in the combustion chamber and having a port aligned with the inlet opening, the pilot chamber being formed in the body and communicated with the port. Desirably, the means for supplying air to the pilot chamber is also operable to supply a combustible fuel to the combustion chamber for a startup of the burner. If desired, the pilot assembly is removably attached to the head at the one end of the head to allow access to the combustion chamber.

The accompanying drawings, which are incorporated in and constitute a part of this specification, illustrate embodiments of the invention and, together with description serve to explain the principles of the invention.

DESCRIPTION OF THE PREFERRED EMBODIMENTS

Reference will now be made in detail to the present preferred embodiment of the invention, examples of which are illustrated in the accompanying drawings.

Figure 1:
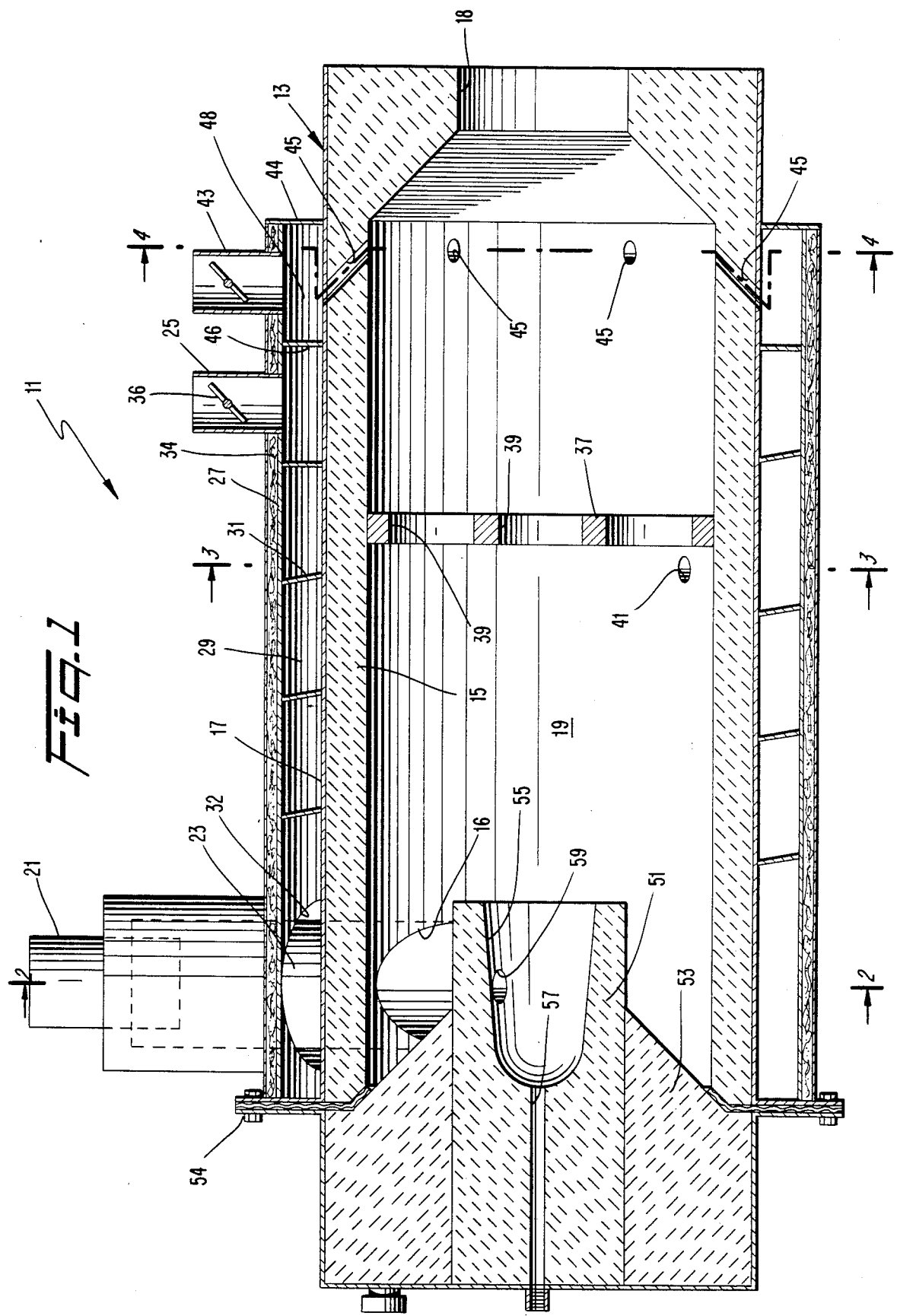
FIG. 1 is a vertical cross sectional view of a preferred form of burner constructed according the the present invention.

The preferred embodiment of the burner of this invention is shown in FIG. 1 and is represented generally by the numeral 11. This burner comprises a head having an inlet opening at one end and an outlet opening at the other end, and a combustion chamber communicating the inlet and outlet openings. As embodied herein, the burner 11 comprises a head 13 constructed of a high temperature refractory material 15 surrounded by a metal casing 17 constructed of, for example, stainless steel or aluminized steel. The head 13 is provided with an inlet opening 16 at one end and an outlet opening 18 at its other end. A combustion chamber 19 communicates the inlet and outlet openings 16,18. Preferably, the head 13 and combustion chamber 19 are cylindrical in configuration.

In accordance, with the invention, means is provided for delivering granulated solid fuel to the inlet opening, and means is provided for delivering combustion air to the inlet opening. In a preferred form, the granulated, solid fuel and combustion air are delivered to a passageway which communicates with the inlet opening, and the fuel and combustion air mix prior to entering the combustion chamber.

As embodied herein, granulated solid fuel is delivered to the burner 11 from a suitable source (not shown) through a fuel conduit 21. Preferably, delivery of the fuel is effected in a constant, controlled and metered fashion and may be carried out either by gravity or by a pneumatic transport means as will be understood by those skilled in the art.

The fuels which are useful in this invention include any fuel which can be ground or otherwise formed into granulated or particle form. Preferably, the particles should be less than about one quarter inch in diameter although other forms, such as wood shavings, can also be used. Possible fuels include granulated or ground-up wood and wood shavings, sawdust, ground rubber, sugar cane waste (bagasse) cotton gin waste, etc.

Figure 2:
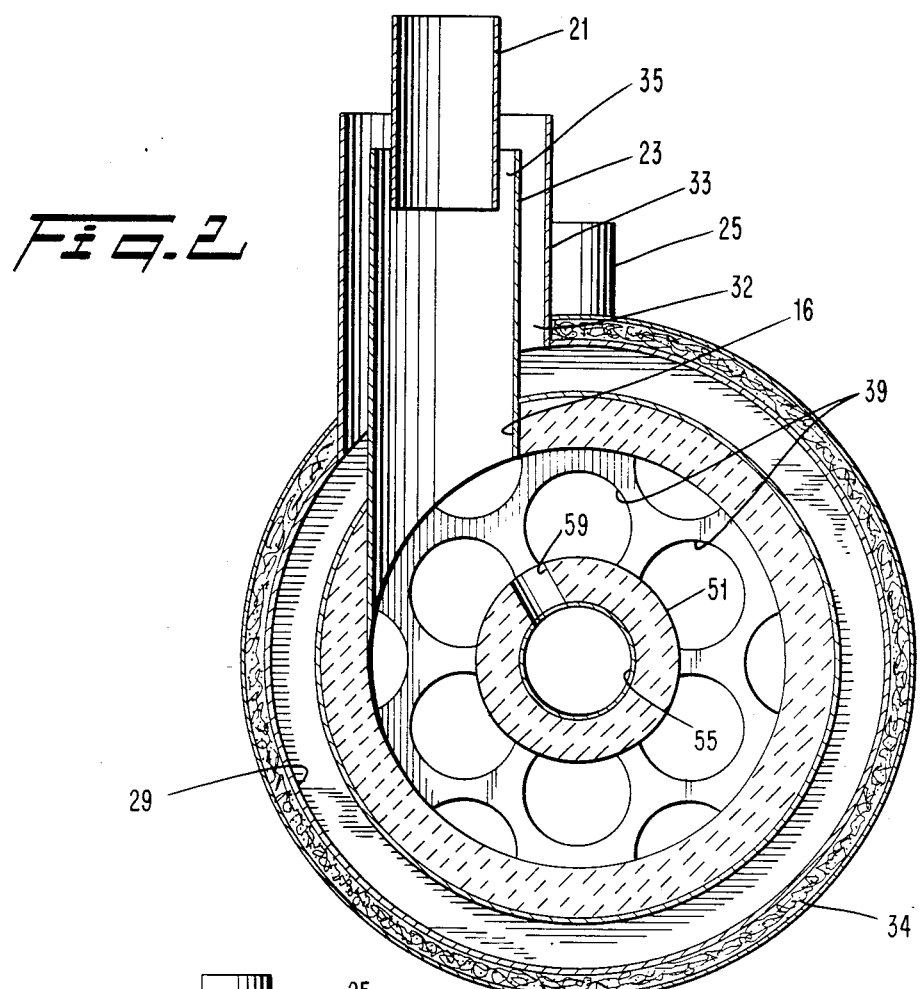
FIG. 2 is a sectional view of the structure of FIG. 1, taken along the line 2—2 thereof.

As further embodied herein, a passageway is formed by a conduit 23 which extends through the inlet opening 16 and into the combustion chamber 19. Fuel conduit 21 extends into and terminates within the passageway conduit 23 so that fuel particles conveyed through the conduit 21 pass into the passageway conduit 23 and enter the combustion chamber 19. Preferably, the passageway conduit 23 is offset from the center of the combustion chamber 19 so that entering air/fuel mixture swirls around the combustion chamber 19 (See FIG. 2).

In accordance with invention, means is provided for delivering combustion air to the burner inlet opening. In a preferred form, the combustion air delivery means includes means defining a cavity surrounding the burner head and communicated at one end with the passageway at the inlet opening. In a most preferred form, means in the cavity forms a spiral duct so that combustion air entering the cavity is caused to travel in a spiral path around the head and to be preheated prior to entry into the passageway.

As embodied herein, primary combustion air is delivered by, for example, a forced air fan (not shown) to an air inlet pipe 25 which is connected to a cylindrical shell 27 which surrounds the casing 17. The shell 27 is spaced from the casing 17 and forms an annular cavity 29 therewith. A spiral fin or vane 31 is disposed in the cavity 29 and is connected to both the shell 27 and the casing 17 so that air entering the cavity 29 through the pipe 25 is caused to travel through a spiral duct formed by the parts and in a left-hand direction as seen in FIG. 1. A suitable insulating material 34 surrounds the shell 27.

The air flowing through the spiral duct in the cavity 29 travels along a substantial length of the burner head 13 and is heated by the heat of combustion in the combustion chamber 19. The heated air exits the cavity 29 through an opening 32 and enters a closed conduit 33 which is concentric with and surrounds the conduits 21,23 (see FIG. 2). The heated combustion air then enters the passageway conduit 23 through an annular gap 35 between the conduit 23 and the conduit 21. The preheated combustion air, therefore, mixes with the fuel in the conduit 23 and the air/fuel mixture enters the combustion chamber 19.

In accordance with the invention, the passageway and the fuel and air delivery means are constructed so that a negative pressure zone is created in the fuel conduit. Also, the volume of air entering with the fuel creates a velocity in the passageway conduit such that the velocity of the entering air/fuel mixture is greater than the flame speed of the fuel. The "flame speed" of a fuel will be understood to mean the speed at which flame travels along that fuel. It will be appreciated that it is important that the velocity of fuel entering the burner 19 be greater than its flame speed to prevent flashback and/or explosion in the fuel pipeline.

As embodied herein, the annular gap 35 is sized so that combustion air passing through the gap 35 and past the end of the fuel conduit 21 causes an aspirating effect which creates a negative pressure zone in the conduit 21. Also, the diameter of the passageway conduit 23 is selected (as are other parameters of the fuel and air supply) so that the fuel and air travels through the conduit 23 at a velocity exceeding the flame speed of the particular fuel used.

The flame speed for wood particles ranges from about 8 to about 14 feet per second. The velocity of the combustion air and fuel passing through the passageway conduit 23 desirably is somewhat greater than this and desirably may be as high as about 60 feet per second.

A control valve 36 is provided at the air inlet pipe 25 to control the flow of combustion air to the burner. The valve 36 may be manually or automatically controlled as will be understood by those skilled in the art.

Figure 3:
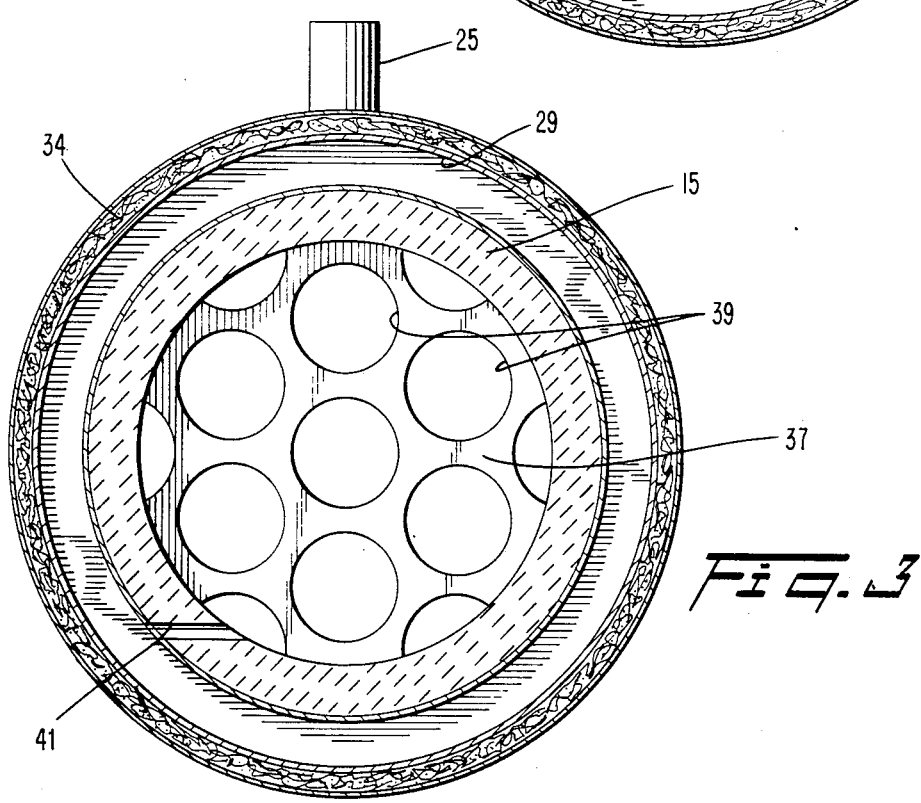
FIG. 3 is a sectional view of the structure of FIG. 1, taken along the line 3—3 thereof.
Figure 4:
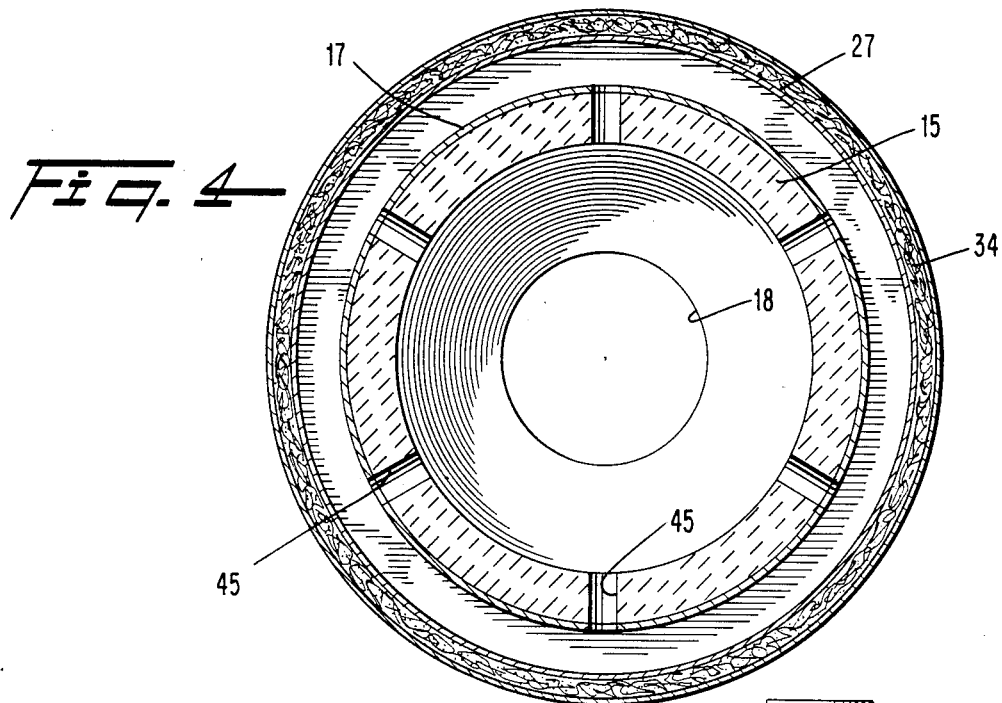
FIG. 4 is a sectional view of the structure of FIG. 1, taken along the line 4—4 thereof.

In accordance with the invention, means is provided in the combustion chamber forming an apertured barrier for preventing passage of fuel particles larger than a predetermined size. As embodied herein, an apertured plate 37 is provided in the combustion chamber 19 at approximately a midpoint along its length. The plate 37 is provided with a plurality of apertures or openings 39 which are sized to allow flue gases and fuel particles below a predetermined size to pass freely therethrough. Larger fuel particles, particularly those which have not been incinerated completely, impact on the plate 37 and accumulate at the bottom of the combustion chamber 19 at the upstream size of the plate 37. A secondary air inlet port 41 is provided in the head 13 near the bottom of the combustion chamber 19 and on the upstream size of the plate 37 and allows a small amount of combustion air from the cavity 29 to enter the combustion chamber at this point (see FIGS. 1 and 3). This assures the presence of combustion air to fully incinerate the larger particles in this zone. In addition, the port 41 extends tangentially to the combustion chamber to prevent the accumulation of ash in this zone.

In accordance with the invention, means is provided for delivering cooling air to the combustion chamber at a location near the outlet opening for controlling the temperature of flue gas exiting the burner. As embodied herein, cooling air is delivered by means, for example, a forced air fan (not shown) to an inlet pipe 43 which is connected to the shell 27 (see FIG. 1). An end wall 44 of the shell 27 and an annular member 46 in the shell form a cavity 48 which surrounds the head 13 and is communicated with the pipe 43 and is separated from the cavity 29. A plurality of ports 45 extend through the burner head 13 and communicate the cavity 48 with the combustion chamber 19 near the outlet opening 18. The ports 45 are equally spaced around the burner head 13 and are inclined toward the opening 18 as shown in FIG. 1.

The quantity of cooling air delivered to the combustion chamber 19 is controlled by a valve 47 in the pipe 43 which may be manually but preferably is automatically controlled. The quantity of air delivered to the pipe 43 is selected based upon the desired output temperature of the burner. Thus, it may be desirable to cool the temperature of the flue gases before they exit the outlet opening 17 for certain applications. By carefully regulating the air to the pipe 43, the output temperature of the flue gases from the burner can be closely controlled.

In accordance with the invention, a pilot assembly is provided in the combustion chamber which includes means defining a pilot chamber in the combustion chamber for receiving some of the fuel entering the burner inlet opening and means for supplying air to the pilot chamber. As embodied herein and shown in FIG. 1, a pilot block 51 is supported in an end block 53 which is fixed to the burner head 13 by a flange and bolt connection 54. The pilot block 51 and end block 53 are both constructed of high temperature refractory material and the pilot block 51 has a portion extending inwardly beyond the end block 53, as shown in FIG. 1. An outwardly diverging pilot chamber 55 is formed in the inner end of the pilot block 51 and is communicated with a passageway 57 which extends to the outer end of the pilot block 51. A port 59 extends laterally through the pilot block 51 at the pilot cavity 55.

A portion of the fuel entering the combustion chamber 19 by way of the passageway conduit 23 passes through the port 59 and enters the pilot chamber 55. During combustion in the combustion chamber 19, the fuel in the pilot cavity 55 mixes with air entering the pilot chamber 55 through the passageway 57 and burns within the pilot chamber. This produces a constant ignition source which allows the burner to operate over a wide turndown range. "Turndown" is achieved by reducing the fuel and combustion air supply to the burner.

Experiments have shown that with the constant pilot of the present invention, the burner can operate through a turndown ratio on the order of from about five to one to about six to one. Thus, if operation of the burner at full supply produces an output of 400,000 btu, the burner of this invention can be "turned down" to a level where the output is from about 66,000 to about 80,000 btu. The normal turndown ratio available on existing solid granulated fuel burners is less than about three to one and is more on the order of about two to one. Thus, the burner of the present invention may be turned down to a very low level during periods of reduced demand or non-demand without being turned off and will conserve fuel while maintaining a constant ignition source to provide instantaneous operation when demand is resumed.

As further embodied herein, the constant pilot may also serve as an ignition source for the burner during startup. Thus, a flame produced from a combustible fuel such as a mixture of air and oil may be delivered through the passageway 57 into the constant pilot chamber 55. Air and solid fuel particles in the pilot chamber 55 are ignited by this flame and serves to ignite the air/fuel mixture in the combustion chamber 19. Once ignition and combustion has been obtained, the flame source to the pilot chamber 55 is removed and only air enters the pilot chamber thereafter.

Figure 5:
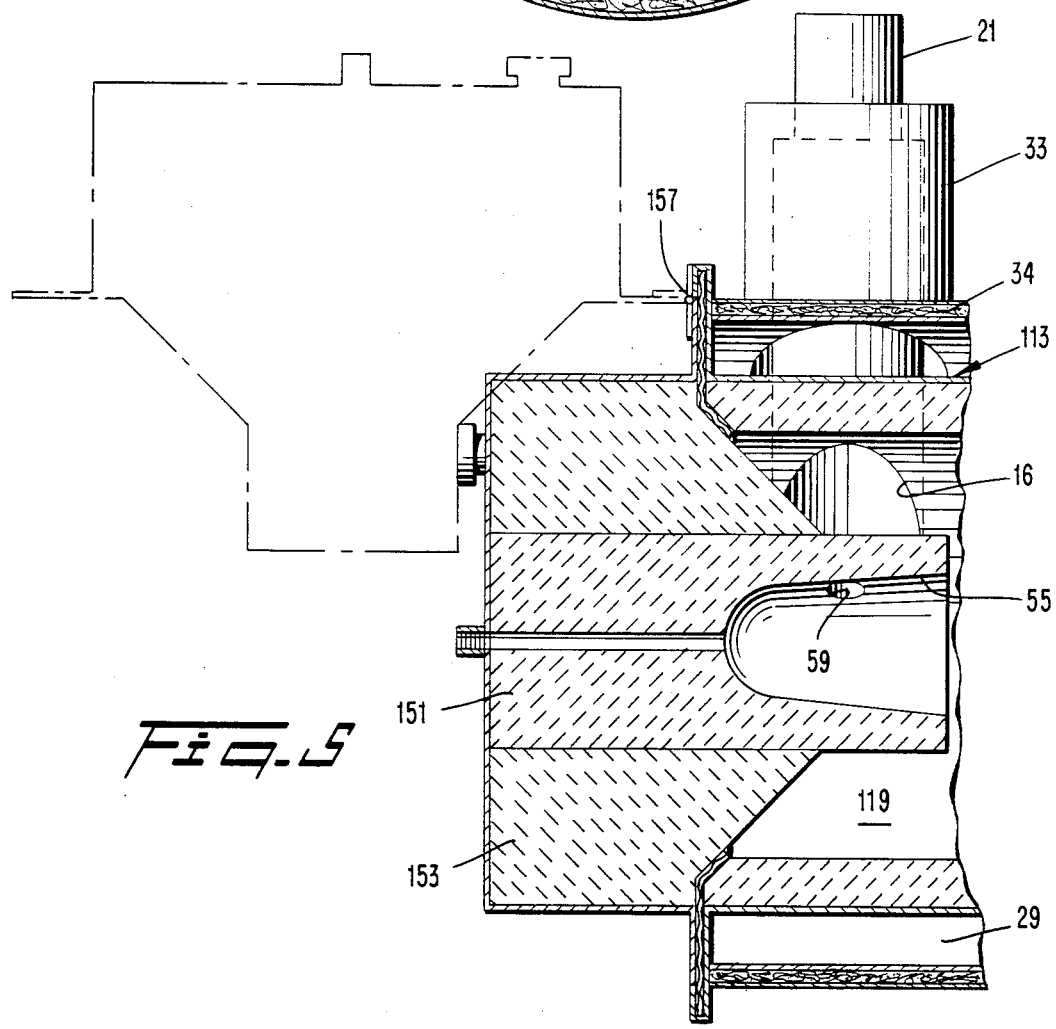
FIG. 5 is a partial view similar to FIG. 1 and showing a modified form of the invention.

FIG. 5 shows a slightly modified version of burner constructed in accordance with the invention. In this embodiment, the end block 153 and the pilot block 151 are connected by a hinge 157 to the burner head 113. This allows the end block 153 and the pilot block 151 to be swung outwardly to a position as shown in dot-dash lines in FIG. 5 to allow free access to the combustion chamber 119. In this embodiment, a fire can be built in the combustion chamber 119 with scrap materials for burner startup. In all other respects, the embodiment of FIG. 5 is the same as shown in FIGS. 1–4 and described above and like numerals indicate similar parts in all the figures.

It will be understood that the temperature achieved in the burner of this invention is largely a function of the fuel used, and that the output temperature at the outlet opening 17 is determined by the desired use for the burner. Using ground or granulated wood particles sized $\frac{1}{4}''$ or smaller and a constant supply of primary combustion air is maintained at from about 160 to about 200 percent of theoretical, the temperature in the combustion chamber 19 can reach about 2400° to about 2500° F. which desirably is about 200° to about 300° F. below the ash fusion temperature of the fuel. Combustion air traveling through the cavity 29 is superheated and reaches a temperature of from about 800° to about 1200° F. when it passes through the annular gap 35.

Depending upon the desired use to which the burner is to be put, it may be desirable to allow the flue gases to exit the burner through oulet opening 18 at the combustion temperature, i.e., 2400° to 2500° F. Alternatively, it may be desirable that the temperature of the flue gas exiting the burner through the outlet opening 18 be somewhat less, than as low as 400° to about 500° F. In that case, sufficient cooling air is admitted to pipe 43 and enters the combustion chambers through the ports 45 to cool the flue gases to the desired temperatures.

It will be apparent to those skilled in the art that various additions, substitutions, modifications and omissions can be made to the burner of this invention without departing from the scope or spirit of the invention. Thus, it is intended that the present invention cover the additions, substitutions, modifications and omissions provided they come within the scope of the appended claims and their equivalents.

What is claimed is:

1. A burner for use in burning granulated solid fuel comprising a head having a lateral inlet opening at one end and an outlet opening at its other end, a combustion chamber communicating said inlet and outlet openings, means defining a passageway communicating with said inlet opening, means for delivering granulated solid fuel to said passageway, means for delivering combustion air to said passageway to mix with said fuel prior to entering said combustion chamber including means defining a cavity surrounding said head and extending along a major portion of the combustion chamber and communicated at one end with said passageway, air inlet means communicated with the other end of said cavity, means in said cavity forming a spiral duct therein along substantially the entire length of said cavity and circumscribing the combustion chamber from said air inlet means to said air delivery means whereby combustion air entering said cavity from said air inlet means is caused to travel in a spiral path through said spiral duct around said head and combustion chamber and to be preheated prior to entry into said passageway.

2. A burner as claimed in claim 1, including a valve in said air inlet means for controlling the flow of combustion air to said passageway.

3. A burner as claimed in claim 1, said passageway including a tubular conduit extending into said head at said inlet opening, said fuel delivery means including a conduit communicated with said passageway conduit, said combustion air delivery means including means for delivering said combustion air to said passageway conduit upstream of said fuel delivery conduit.

4. A burner as claimed in claim 3, said combustion air delivery means including a conduit concentric with and surrounding said passageway conduit and said fuel delivery conduit, said fuel delivery conduit terminating inside said passageway conduit.

* * * * *